Feb. 14, 1928.
O. J. BIRD
1,658,878
AUTO TRUCK WINCH
Filed Nov. 23, 1926
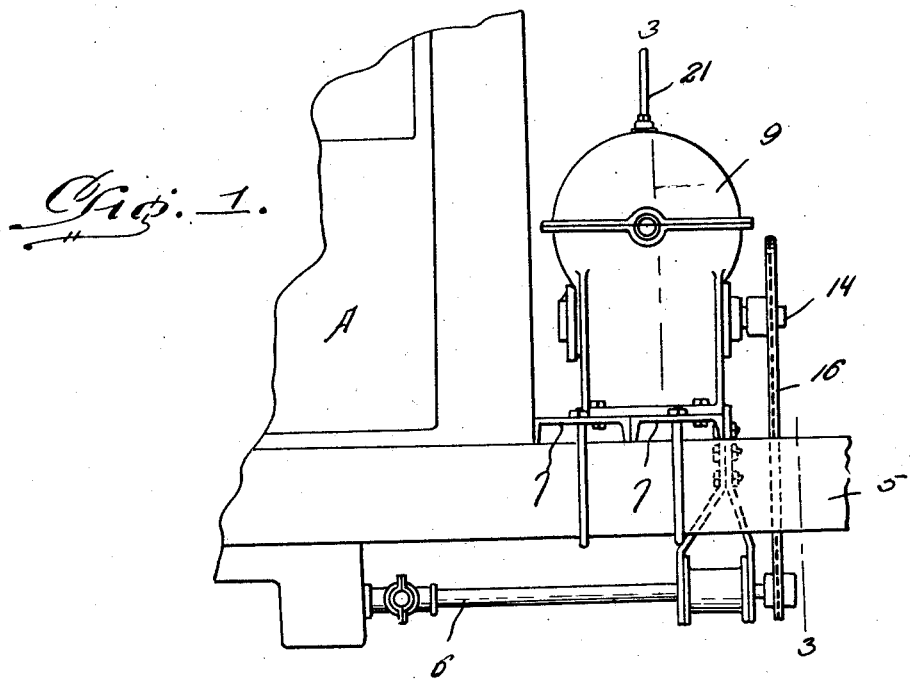
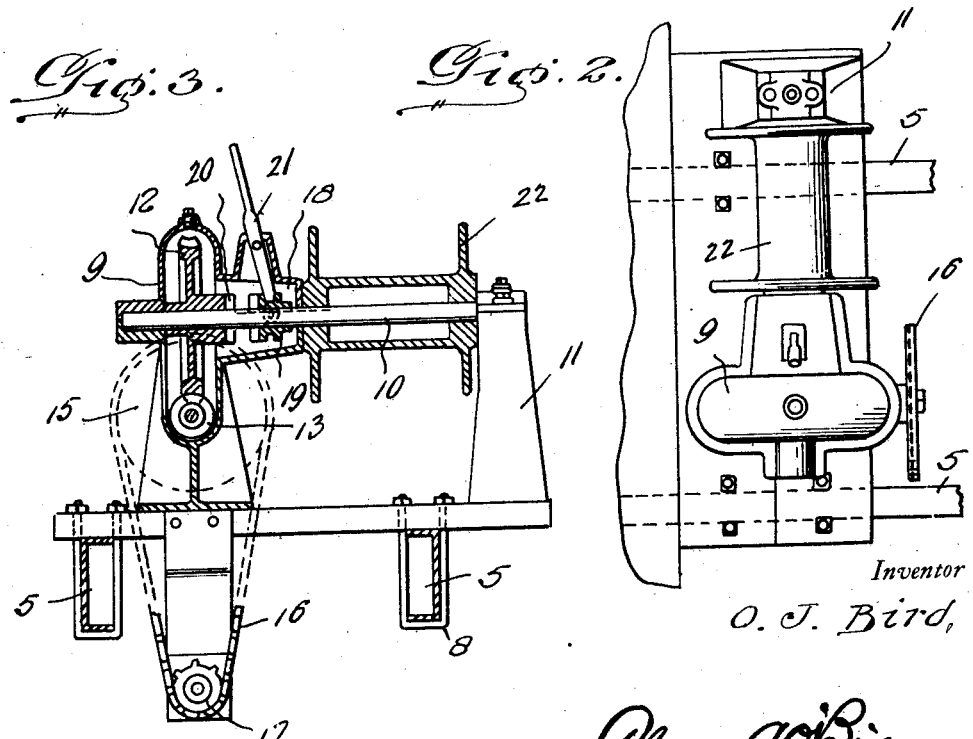
Inventor
O. J. Bird,
By Clarence A. O'Brien
Attorney Patented Feb. 14, 1928.

1,658,878

UNITED STATES PATENT OFFICE.

OSCAR J. BIRD, OF HOWELL, MICHIGAN.

AUTO TRUCK WINCH.

Application filed November 23, 1926. Serial No. 150,268.

This invention relates to new and useful improvements in winches, and has for its primary object to provide a device of this character that is primarily adapted for disposition upon automobile trucks for facilitating the loading of the trucks, especially when the same are used in the hauling of logs.

An important object of the invention is to provide a winch of this character that may be installed upon conventionally designed automobile trucks, and this without requiring any alterations or change in construction of the truck mechanism and without requiring great expenditure.

A still further and important object is to provide a winch of this character that is extremely simple of construction, inexpensive of manufacture, and efficient in operation, the same embodying but few parts and these so corelated as to reduce the liability of disarrangement to a minimum.

Other objects will become apparent as the nature of the invention is better understood, the same comprising the novel form, combination, and arrangement of parts hereinafter more fully described, shown in the accompanying drawing and claimed.

In the drawing wherein like reference characters indicate corresponding parts throughout the several views:

Figure 1 is a fragmentary side elevation of an auto truck equipped with a winch constructed in accordance with the present invention.

Figure 2 is a top plan view thereof, and

Figure 3 is a vertical section taken substantially upon the broken line 3—3 of Figure 1.

Now having particular reference to the drawing A designates a conventionally designed auto truck including the usual spaced chassis bars 5—5, and a power take-off shaft 6. Disposed transversely upon the chassis bars 5—5 directly in back of the truck driver's compartment is a pair of relatively wide inverted channel bars 7—7 secured to the chassis bars 5—5 by means of U-bolts 8. Supported upon these channel bars is the winch mechanism per se that consists of a sectional gear casing 9 of generally circular formation within which is journaled one end of a shaft 10, the opposite end thereof being journaled upon the upper end of a vertical standard 11 at the opposite ends of the supporting bars 7—7. Loose upon this shaft 10 within the casing 9 is a large worm gear 12 that has mesh with a worm 13 in the lower portion of said casing. This worm 13 is secured on a shaft 14, one end of which projects through the casing and carries a large sprocket gear 15, over which is trained an endless chain 16 that extends downwardly between the auto truck chassis bars 5—5 and is in turn trained over a smaller sprocket gear 17 upon the end of the power take off shaft 6.

Projecting laterally from the inner side of the gear casing 9 centrally of the worm gear 12 is a housing 18 through which said shaft 10 also extends. Splined upon the shaft 10 within this housing 18 is a clutch member 19 the clutch face of which is adapted for clutching engagement with a clutch face 20 upon the adjacent side of the worm gear 12 centrally thereof, see Figure 3. This clutch member 19 is circumferentially channeled for receiving the fork of a shifting lever 21 that projects through the housing 18 so that said clutch member 19 may be moved into or out of engagement with the clutch face 20 of the worm gear 12.

Keyed on the shaft 10 between the housing 18 and the shaft supporting standard 11 is a cable drum 22 to which one end of a pull cable, not shown, is attached.

Obviously, when the clutch member is engaged with the clutch face of the worm gear 12 the shaft 10 will be rotated for turning the drum 22 for winding the pull cable thereon, resulting in the dragging of the logs or other articles to which the cable may be attached upon the truck, it being of course necessary to suitably guide the same thereon.

In view of the foregoing description when considered in conjunction with the accompanying drawing it will at once be apparent that I have provided a simple, and efficient auto truck winch that is well adapted for all the purposes heretofore designated, even though I have herein shown and described the invention as consisting of certain detail structural elements, it is nevertheless to be understood that minor changes may be made therein without affecting the spirit and scope of the appended claim.

Having thus described the invention, what I claim as new is:—

In an automobile truck winch, wherein the truck is provided with a power take off shaft, a supporting base, disposed transversely upon the frame bars of the truck and anchored thereto, a vertically extending gear case secured on the supporting base at one end thereof, a shaft supporting standard arranged vertically upon the base at the opposite end thereof, a driven shaft journaled at its ends within the gear case and upon said standard, a housing extending laterally from the inner side of the gear case and through which said shaft extends, a worm gear loosely mounted on the end of the shaft within the gear case, a shaft arranged below the driven shaft and extending at right angles thereto, one end of said last mentioned shaft extending into the gear case, a worm on the inner end of the last mentioned shaft meshing with the worm gear, a driving connection between the outer end of the last mentioned shaft and the power take off shaft, a cable winding drum keyed on the driven shaft between the standard and the laterally projecting housing, a clutch face formed on the inner side of the loosely mounted worm gear, a clutch splined on the driven shaft and arranged within the laterally projecting housing, and a lever operatively connected at one end with the clutch and extending upwardly through the housing, for moving the clutch into engagement with the clutch face of the worm gear whereby to effect the rotation of the driven shaft.

In testimony whereof I affix my signature.

OSCAR J. BIRD.